United States Patent [19]

Macaulay et al.

[11] 3,784,414
[45] Jan. 8, 1974

[54] BATTERY SEALANT CARRIER HAVING ADHESIVE PATCHES IMPREGNATED THEREIN AND A METHOD FOR MAKING IT

[75] Inventors: William R. Macaulay, Madison; Ralph H. Feldhake, Verona, both of Wis.; Dale G. Higgins, East Brunswick; Richard C. Santa Maria, Edison, both of N.J.

[73] Assignee: ESB Incorporated, Philadelphia, Pa.

[22] Filed: June 1, 1972

[21] Appl. No.: 258,663

[52] U.S. Cl. .................................. 136/175, 136/111
[51] Int. Cl. ............................................. H01m 3/04
[58] Field of Search ............................ 136/111, 175

[56] References Cited
UNITED STATES PATENTS
3,694,268 9/1972 Bergum .............................. 136/175
3,701,690 10/1972 Dermody et al. .................. 136/175

Primary Examiner—Donald L. Walton
Attorney—Raymond L. Balfour

[57] ABSTRACT

A battery sealant carrier is impregnated with adhesive patches each of which is in the form of a closed loop. The surfaces of the adhesive patches rise above the surfaces of the carrier on at least one and preferably both sides of the carrier. The patches are produced by passing the carrier between a pair of applicators, the first of which has a surface that is sufficiently rigid and uncompressible so that it does not deform and the second of which has a surface that is sufficiently elastomeric so that it deforms during adhesive application. Preferably the two applicators apply adhesive to the carrier simultaneously. The adhesive patches applied by the second applicator are preferably applied at a higher viscosity than those applied by the first applicator. Preferably the sealant carrier is also the battery separator material, in which case there is an area of separator material inside each adhesive patch into which the adhesive has not been impregnated; alternatively, the sealant carrier may have a void area inside each adhesive patch, with the void area being provided to receive a piece of battery separator material.

22 Claims, 10 Drawing Figures

PATENTED JAN 8 1974 3,784,414

ADHESIVE PATCHES

BATTERY SEALANT CARRIER HAVING ADHESIVE PATCHES IMPREGNATED THEREIN AND A METHOD FOR MAKING IT

BACKGROUND OF THE INVENTION

In U.S. Pat. No. 3,701,690, it has been proposed to impregnate a series of patches into a sealant carrier composed of battery separator material. Each patch of adhesive is in the form of a closed loop. After the adhesive patches have been impregnated the sealant carrier is assembled into a battery in such a manner that each adhesive patch is sealed to a liquid impervious layer around the battery's electrodes.

A number of factors must be considered in designing machinery and a process to implement the method proposed in Patent 3,701,690. The quality of the seal obtained in the resultant battery is improved by having a deposit of adhesive on the liquid impervious layer which is mated with the sealant carrier before the two are sealed together, but the very fact that the liquid impervious layer is impervious limits the amount of adhesive which can be applied to that layer. In order to obtain quality seals, therefore, it may be necessary to apply substantial amounts of adhesive to the sealant carrier.

The adhesive must also be impregnated thoroughly into and throughout the thickness of the sealant carrier in order to prevent liquid from the electrolyte from escaping from the battery through the sealant carrier. This objective is made difficult to achieve when the sealant carrier is made from material which is also the battery separator since separators are intentionally made from materials which will hold and transmit the electrolyte like a wick. And while adhesives may be impregnated into sealant carriers by methods analogous in some respects to the techniques used in the printing arts, the analogy is incomplete in the crucial respect that complete impregnation of an ink throughout the thickness of the substrate is seldom required in printing and, even where it is, the ink does not have the high viscosity possessed by adhesives.

Further complicating the matter is the fact that the sealant carrier must be under tension if it is to be processed as a continuous strip through rotary impregnating machinery. The tension produces stretching in the sealant carrier which, due to the irregularities in the carrier material, is not consistent in amount, at least on a highly localized basis. The sealant carrier is also usually somewhat inelastic. As a result of the stretching and the properties of the sealant carrier, serious registration problems may be encountered if adhesive patches are deposited on the two sides of the carrier in successive applications. If simultaneous applications on both sides of the carrier are attempted the forces required to get the necessary thorough impregnation throughout the entire thickness of the carrier may, together with the properties of the carrier material, make it difficult or impossible to get the required thorough impregnation.

SUMMARY OF THE INVENTION

This invention provides patches of adhesive which are impregnated substantially throughout the entire thickness of a battery sealant carrier and in which the adhesive in the patch rises above the surface of the sealant carrier on at least one and preferably both sides of the carrier. Each patch is in the form of a closed loop. The sealant carrier preferably comprises battery separator material so that there is an area of separator material inside each adhesive patch into which the adhesive has not been impregnated; alternatively, the sealant carrier may have a void area inside each adhesive patch, the void area being provided to receive a piece of battery separator material during assembly of the battery.

The adhesive used to apply the second patch is preferably at a higher viscosity when applied onto the sealant carrier than is the adhesive used to apply the first patch. The two patches are preferably applied simultaneously.

Preferably the first adhesive patch is applied by a first applicator the surface of which has a recessed area in the configuration of the desired adhesive patch and in which the recessed area contains adhesive to be transferred to the adhesive carrier. The second patch is applied by a second applicator on the surface of which is a quantity of adhesive, which quantity of adhesive is of the configuration of the desired second patch and which quantity of adhesive rises above the surface of the second applicator. The surface of the first applicator is sufficiently rigid and uncompressible so that it does not deform substantially during application of the first patch, while the second patch is applied by a second applicator the surface of which is sufficiently elastomeric so that it deforms during application of the second patch.

DESCRIPTION OF THE PREFERRED EMBODIMENT

This invention is concerned with adhesive patches which are applied onto and impregnated into a sealant carrier. The adhesive patches, each of which is in the form of a closed loop, are used to obtain liquid impervious seals around the electrodes in batteries.

In the assembled batteries the area inside each adhesive patch will be occupied by battery separator material and electrolyte. According to one embodiment of this invention which minimizes the number of components and handling steps required to assemble the batteries, the sealant carrier comprises battery separator material so that the separator and sealant carrier are always structurally and integrally connected during battery assembly. According to another embodiment which permits the sealant carrier material to be selected without regard for its ability to function as a separator and electrolyte retainer, the sealant carrier has a void area inside each adhesive patch, and a discrete piece of separator material is placed into each void area during assembly of the battery. FIGS. 1 through 6 and 8 will illustrate constructions in which the sealant carrier comprises separator material, while FIG. 10 will illustrate the alternative construction in which there is a void area inside each adhesive patch.

Figure 1:
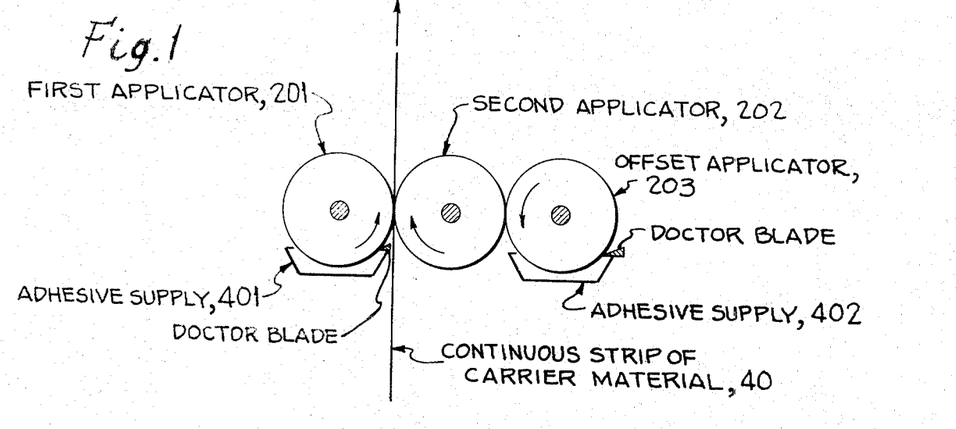
FIG. 1 is a schematic view illustrating a pair of applicators applying adhesive patches to the opposite sides of a continuous strip of porous sealant carrier material.
Figure 2:
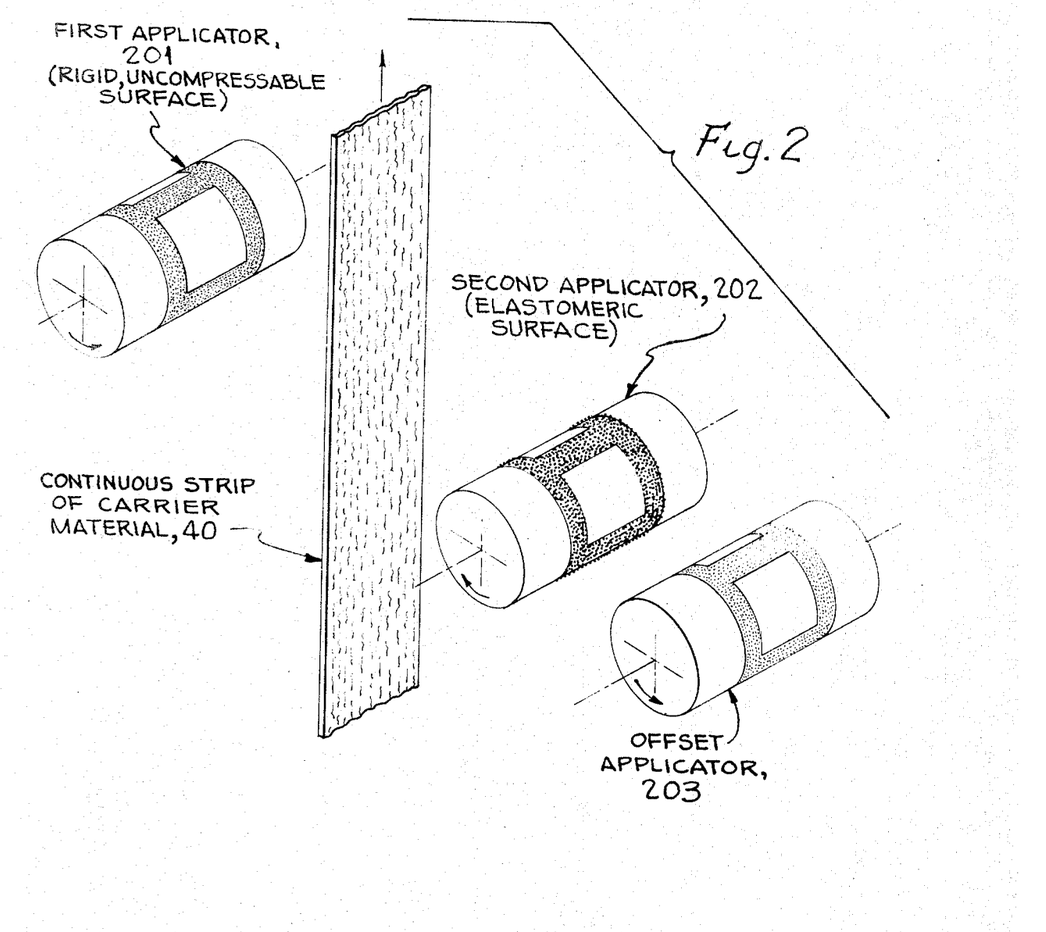
FIG. 2 is an exploded view of the sealant carrier and adhesive applicators shown in FIG. 1.
Figure 3:
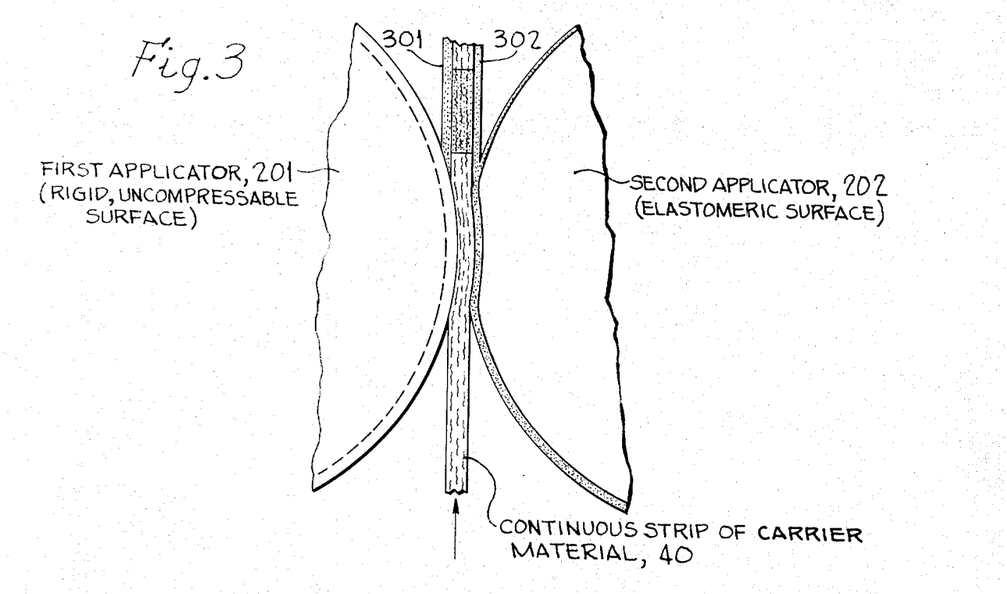
FIG. 3 illustrates the continuous strip of sealant carrier being passed between the adhesive applicators so that adhesive patches are applied onto the opposite sides of the carrier simultaneously.
Figure 4:
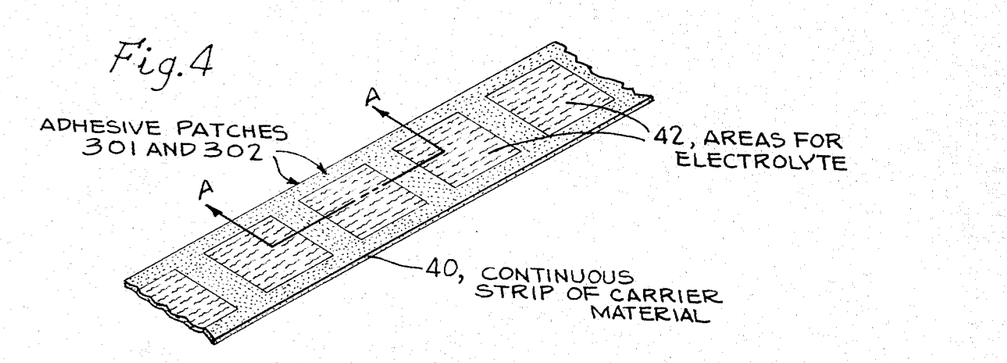
FIG. 4 shows a portion of the continuous sealant carrier after the patches of adhesive have been impregnated into it.
Figure 5:
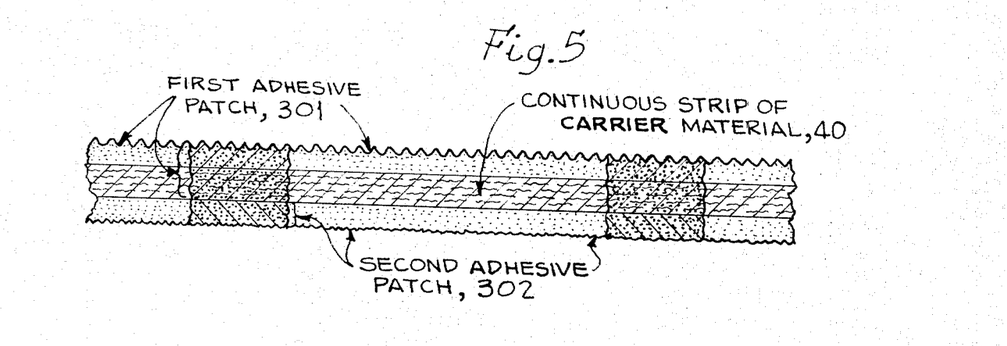
FIG. 5 is a cross section of the portion of sealant carrier shown in FIG. 4 taken along the line A—A of FIG. 4.

FIGS. 1 through 3 illustrate a pair of applicators 201 and 202 which are used to apply a succession of adhesive patches 301 and 302 onto the opposite sides of continuous strip of sealant carrier 40. The carrier 40 with its adhesive patches 301 and 302 is illustrated in FIG. 4 and 5. As shown in FIG. 4, each patch is in the form of a closed loop inside of which is an area of separator material 42 where the adhesive has not been applied; the area 42 will subsequently be impregnated with electrolyte for the battery.

According to one of the principles of this invention the first applicator 201 applies the first patches 301 onto one side of the sealant carrier 40. Sufficient adhesive is applied by the first applicator 201 so that the surfaces of the resultant first patches 301 rise above the surface of the carrier 40, as shown in FIGS. 3 and 5. The second applicator 202 supplies second adhesive patches 302 onto the other side of the separator material 40, with the second patches 302 being substantially opposite and coextensive with the first patches 301. The surfaces of the resultant second patches 302 also rise above the surface of the sealant carrier. The resultant sealant carrier is thus provided with the substantial amounts of adhesive needed to obtain quality seals in batteries.

The second patch 302 is best obtained by having the second applicator 202 apply its adhesive while that adhesive is at a higher viscosity than the adhesive which is applied by the first applicator. The different viscosities have been found by experimentation to be desirable. The different viscosities may be obtained by using the same type of adhesives on both sides of the carrier but heating them to different temperatures, or by using two different adhesives which have different viscosities at the same temperatures. Volatile solvents or other materials may be included in the adhesives for the purpose of controlling viscosity. The viscosity of the adhesive at the moment it is applied onto the carrier may be controlled by temperature controls internal to the applicators and/or external temperature control devices such as hot air blowers, heating lamps, and others. The viscosity of the adhesive may be changed just before the adhesive is applied onto the carrier by directing a jet of warm or cool air toward the adhesive.

Preferably the surface of the first applicator 201 is sufficiently rigid and uncompressible so that it does not deform substantially during application of the first patch. As shown in FIG. 2, the surface of the first applicator also has a recessed, engraved area in the size and configuration of the desired adhesive patch; adhesive contained in this recessed area is transferred to the adhesive carrier to provide the first patch 301.

Preferably the surface of the second applicator 202 is sufficiently elastomeric so that it deforms during application of the second patch. As shown in FIG. 2, the adhesive on the second applicator 202 rises above the surface of that applicator. The adhesive may be conveniently applied to the surface of the second applicator 202 by transfer from an offset applicator 203 which applicator 203 may be of the general size and construction detail as the first applicator 201.

Figure 6:
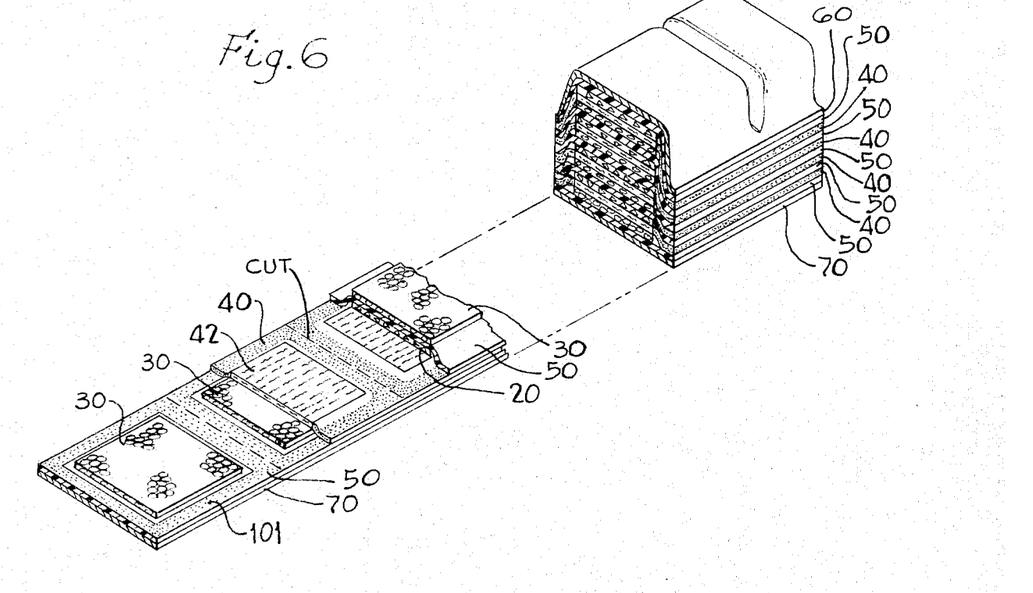
FIG. 6 illustrates the sealant carrier being collated into a battery where the adhesive patches will provide seals.

FIG. 6 illustrates several of the sealant carriers 40 composed of separator material with their adhesive patches being assembled into a continuous chain of multicell batteries. In the particular construction shown in FIG. 6 the sealant carriers are spaced alternately with continuous strips of liquid impervious material 50 such as an electrically conductive plastic. Intermittent deposits of positive electrodes 20 are spaced along one side of each strip 50, while on the other side of each strip 50 and substantially opposite the positive electrodes are intermittent deposits of negative electrodes 30. The area 42 inside each adhesive patch is interposed between a positive electrode 20 and a negative electrode 30 where it functions as a separator and electrolyte retainer. Surrounding each deposit of positive electrode 20 and negative electrode 30 is a patch of adhesive sealant 101 which matches with and seals to an adhesive patch 301 or 302 in the adjacent sealant carrier 40. It has been determined empirically that due to the impervious nature of the material 50 only a minor quantity of adhesive, not enough to produce a quality seal, can be satisfactorily applied onto the surface of the material 50, and therefore it is desirable to overload the sealant carriers 40 with enough adhesive to produce the desired seal; hence the desirability of having the surfaces of the adhesive patches 301 and 302 rise above the surfaces of the sealant carrier 40, as shown in FIGS. 3 and 5.

Figure 7:
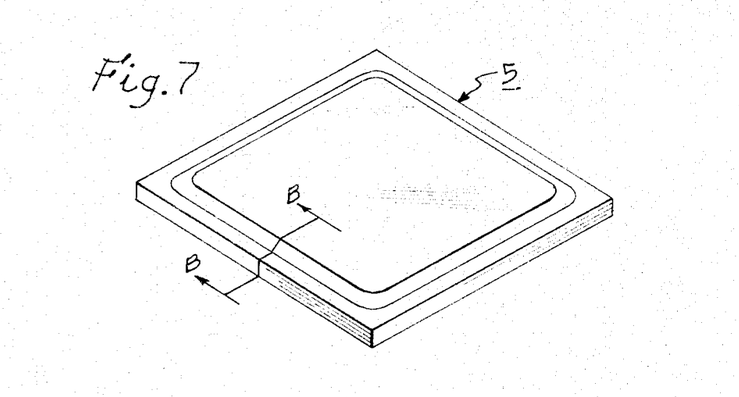
FIG. 7 is an oblique view of a multicell battery containing the adhesive impregnated sealant carrier.
Figure 8:
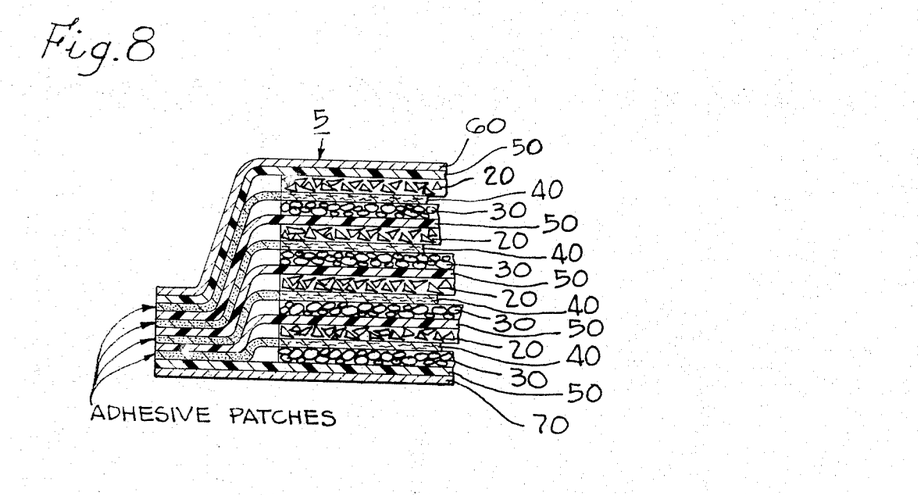
FIG. 8 illustrates a cross section of the battery shown in FIG. 7 taken along the line B—B of FIG. 7.

FIG. 7 shows one of the assembled multicell batteries 5 after it has been produced as shown in FIG. 6 and cut apart from other similarly produced batteries. FIG. 8 shows a cross section of the battery 5. FIG. 8 illustrates how the adhesive patches which are impregnated into the sealant carriers 40 mate with and seal to the liquid impervious layers 50 to produce liquid impervious seals around the perimeter of each positive electrode 20 and negative electrode 30.

Figure 10:
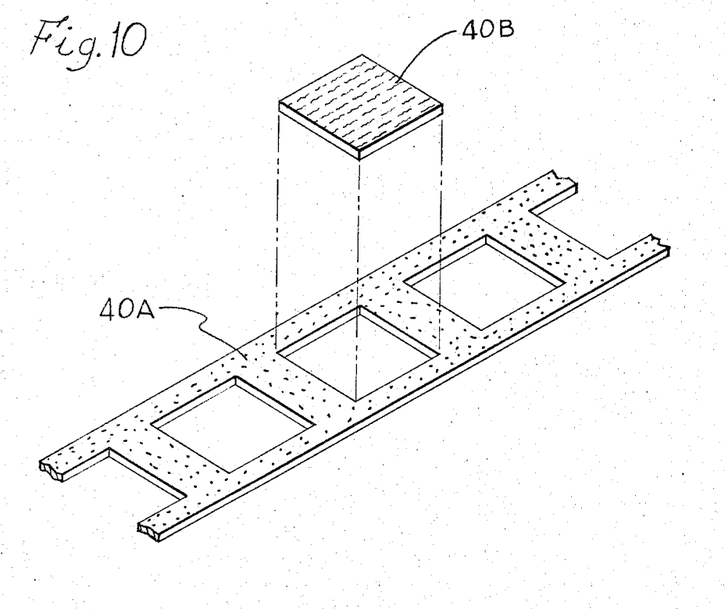
FIG. 10 illustrates a sealant carrier in which there is a void area inside each adhesive patch, the void area being provided to receive a piece of separator material during assembly of the battery.

FIG. 10 illustrates an alternative embodiment of the invention, one in which the sealant carrier 40A has a void area inside each adhesive patch. A discrete piece of separator material 40B is placed into each void area during assembly of the battery. All of the principles of adhesive application discussed above are applicable to the embodiment shown in FIG. 10. It should be stated that whereas the use of separator material for the sealant carrier as shown in FIGS. 1 through 6 and 8 minimizes the number of structurally separate components and simplifies the steps required to assemble the batteries, it also requires the use of a material which is simultaneously a good sealant carrier, a good separator, and a good electrolyte retainer. On the other hand the construction shown in FIG. 10 increases the number of structurally separate components and complicates the steps required to assemble the batteries, but permits the sealant carrier 40A and the separators 40B to be selected from different materials each of which is best suited for its limited purpose.

The embodiments illustrated and described thus far have utilized a continuous strip of sealant carrier and a pair of rotary adhesive applicators which simultaneously apply a succession of adhesive patches to the opposite sides of the carrier web. Other embodiments of the invention are also possible. For one, the rotary applicators may be staggered so that they apply adhesive patches to the opposite sides of the carrier sequentially rather than simultaneously. To achieve this practically, however, it is necessary to obtain proper registration of the second patches with the first. Because of the properties of most sealant carriers which might be used with this invention (e.g., nonuniformity along the length of the strip), the requirement to process the carrier under tension, and the limitations of available machinery, it is sometimes difficult to attain the required precision in registration when the first and second adhesive patches are applied sequentially, and hence there is a preference for simultaneous application.

The invention is not limited either to the use of continuous strips of sealant carrier or to rotary adhesive applicators. The principles described above - - the need to impregnate substantially throughout the entire thickness of the carrier, the need to have the surfaces of the adhesive patches rise above the surface of the carrier, the desirability of applying the adhesive for the second patches at a higher viscosity than that used for the first patches, the desirability of having one rigid and one elastomeric applicator - - all are applicable to other embodiments in which the sealant carrier is processed as discrete pieces rather than as a continuous strip and/or in which applicators of other constructions are employed. This invention is therefore not to be construed as being limited to use with continuous strips of sealant carrier and/or rotary adhesive applicators.

Figure 9:
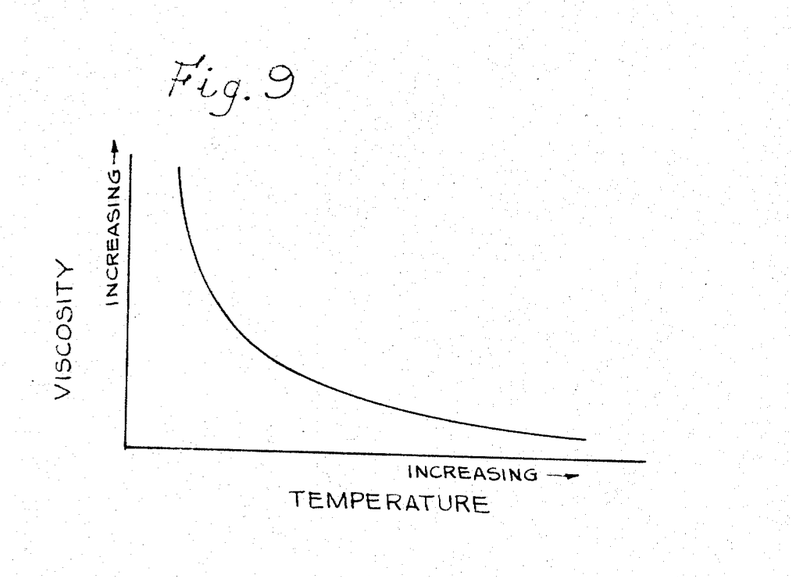
FIG. 9 illustrates the relationship between temperature and viscosity of a typical adhesive.

FIG. 9 is shown to illustrate a general characteristic of heat sensitive adhesives, namely that they become less viscous (i.e., more fluid) with increases in temperature. Because this invention may be used with a wide variety of adhesives it is not possible to define within numerical limits the viscosities of the adhesives which optimize results. It is proper to say, however, that the proper viscosity in the adhesive may be determined by experimentation to obtain best results and that in general the relationship described and implied by FIG. 9 will be found to exist.

A wide variety of adhesives may be used with this invention. The adhesives must be electrically nonconductive where used between two electrically conductive liquid impervious members between which the passage of current is to be prevented. The adhesives themselves may be selected from a wide variety of materials including such adhesives as polyamide and polyester hot melts, catalyzed uncured epoxy resins, phenolic resin solutions, ethylene copolymer hot melts, pressure sensitive elastomer mixtures, thermoplastic resin solution, and natural gums and resins and their solutions, monomeric polymers (either alone or in mixture with other film forming materials), and combinations of these materials. Faster and more thorough and complete impregnation of the adhesive into the carrier may be achieved with many hot melt cements by making the impregnations with heated adhesives. The adhesives which may be used may be ones which attain their adhesive quality for the first time during assembly of the battery as a result of the application of pressure, heat, ultrasonics, electron beam bombardment, or other forms of energy.

The sealant carrier 40 may be made from a wide variety of materials including the synthetic fibers, microporous polymer sheets, and cellulosic materials which are conventional in battery construction as well as from woven or nonwoven fibrous materials such as polyester, nylon, polypropylene, polyethylene, rayon, acrylic, and combinations of these materials.

The batteries which may utilize the separators impregnated by this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide, and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron. This invention may employ the electrolytes commonly used in the LeClanche system (ammonium chloride and/or zinc chloride), various alkaline electrolytes such as the hydroxides of potassium, sodium, and/or lithium, acidic electrolytes such as sulfuric or phosphoric acid, and nonaqueous electrolytes, the electrolytes of course chosen to be compatible with the positive and negative electrodes.

Among the wide variety of electrochemical systems which may be used in the batteries are those in which the positive electrodes comprise manganese dioxide, the negative electrodes comprise metals such as zinc, aluminum, or magnesium, and the electrolyte substantially comprises an acidic solution of inorganic salts. Another commonly known system useful in the batteries is the alkaline manganese system in which the positive electrodes comprise manganese dioxide, the negative electrodes comprise zinc, and the electrolyte substantially comprises a solution of potassium hydroxide. Other aqueous electrolyte systems including those of nickel-zinc, silver-zinc, mercury-zinc, mercury-cadmium, and nickel-cadmium may also be used. Systems employing organic positive electrodes and acidic electrolytes may also be used including rechargeable systems using azodicarbonamide compound electrodes and LeClanche electrolyte.

Where this invention is used in the construction of multicell batteries, any of several constructions of liquid impervious layers which functions as intercell connectors may be used. The particular layers 50 shown in FIG. 8 comprise a single member made from an electrically conductive plastic. The layers 50 might also comprise other electrically conductive single members such as metal sheets or foils, or they might collectively comprise two or more members each of which is conductive. Alternatively, layers 50 might each comprise the combination of a nonconductive member and one or more conductive members which extend through or around the edge of the nonconductive member.

Examples will illustrate the practical application of the claimed concepts.

EXAMPLE 1

The method and hardware illustrated by FIGS. 1 through 3 were used to impregnate adhesive patches into a continuous strip of separator material. The results are illustrated by FIGS. 4 and 5.

The first applicator roll 201 was made from steel plated first with copper and then with hard chrome, was 9.738 inches in diameter, and rotated at 31.2 rpm. It had engraved areas of the length and width desired in the adhesive patches, with the depth of the engraved areas being 9 mils (thousandths of an inch) and the screen ruling in the engraved areas being 39 lines per inch. The second applicator roll 202 was covered with Nordel white rubber, was 9.798 inches in diameter, and rotated at 31.2 rpm. The offset applicator 203 had recessed areas of the width and length corresponding to those desired in the adhesive patches, and the average depth of these areas was 12 mils; the screen ruling in these engraved areas was 28 lines per inch; its diameter was 9.738 inches and it rotated at 31.2 rpm. The spacing between the centers of the applicators was 201, 202 and 203 was such that there was an interference of approximately 1/16 inch between applicators 201 and 202 and an interference of approximately 5/32 inch between applicators 202 and 203, causing applicator 202 to be squeezed or compressed by each of the other applicators. A separator strip made from Style No. 3006-D Pellon polyester non-woven web material and having a normal, uncompressed thickness of 3.7 mils was passed between the applicators at a speed of approximately 40 linear feet per minute and under a tension estimated to be approximately 2 pounds per linear inch. A General Mills experimental polyamide resin No. TPX-617 adhesive at temperatures of approximately 350° and 300°F was applied by the applicators 201 and 203 respectively. The temperature of the adhesive on the surface of applicator 202 at the point immediately preceding the nip was approximately 235°F. The surface of the resultant first adhesive patch 301 illustrated in FIG. 5 rose above one side of the separator material by an average of approximately 2½ mils, while the surface of the resultant second adhesive patch 302 rose above the surface of the opposite side of the separator by an average of approximately 2½ mils. Microscopic inspections and oven tests showed that the first patch 301 had been applied under sufficient temperature and pressure to impregnate the separator material throughout the entire thickness of the separator material and that enough adhesive was impregnated into the separator to substantially prevent electrolyte from wicking from the areas 42 through the adhesive impregnations.

EXAMPLE 2

The process described in Example No. 1 was varied by using Fuller No. S-5026 hot melt adhesive, a commercially available blend known to contain vinyl acetate resins, waxes, and antioxidants. The temperatures of the adhesive on the applicators 201, 202 and 203 were approximately 335, 210, and 275°F, respectively. The reduced temperature on applicator 202 was achieved by blowing cool air (70°F) at the adhesive on the surface of that applicator. The surface of the resultant first adhesive patch 301 rose above one side of the separator material by an average of approximately 2½ mils, while the surface of the resultant second adhesive patch 302 rose above the surface of the opposite side of the separator by an average of approximately 1½ mils. No other machine conditions were changed. No other effects were observed.

Several additional observations should be made about aspects of the process.

First, it appears that there is a range of sealant carrier speeds within which it is not necessary to heat or cool the elastomeric surface of the second applicator 202. Above this range of carrier speeds it is necessary to heat the surface of the applicator 202, while below this range it should prove necessary to cool the surface. As mentioned earlier, the temperatures may be controlled by various temperature control devices or media internal to the applicators and/or by external temperature control devices such as hot air blowers, heating lamps, and others.

The uniformity of the adhesive patches on the separator carrier may be promoted by maximizing the screen ruling in the engraved areas on applicators 201 and 203.

Finally, the choice of the adhesive should be viewed as being to some extent interdependent with the choice of sealant carrier material. The adhesive must have an affinity for the fibres in the sealant carrier to maximize the adhesive penetration into the carrier. In order to get substantially uniform thicknesses of adhesive above the surface of the sealant carrier the carrier should have a substantially uniform porosity.

Having explained our invention, we claim:

1. An improvement in a method of impregnating adhesive patches into a battery sealant carrier comprising:
   a. applying a first patch of adhesive onto one side of the sealant carrier so that the first patch is in the form of a closed loop; and,
   b. applying a second patch of adhesive onto the other side of the sealant carrier so that the second patch is in the form of a closed loop and so that the second patch is substantially opposite and coextensive with the first patch, wherein the improvement comprises
   c. applying the first and second patches at different viscosities, and
   d. applying at least one of the patches so that its surface rises above the surface of the sealant carrier.

2. The method of claim 1 in which the first and second patches are applied simultaneously.

3. The method of claim 1 in which
   a. the first patch is applied by a first applicator the surface of which has a recessed area in the configuration of the desired adhesive patch and in which the recessed area contains adhesive to be transferred to the carrier strip, and
   b. the second patch is applied by a second applicator on the surface of which is a quantity of adhesive, which quantity of adhesive is of the configuration of the desired second patch and which quantity of adhesive rises above the surface of the second applicator.

4. The method of claim 1 in which
   a. the first patches are applied by an applicator the surface of which is sufficiently rigid and uncompressible so that it does not deform substantially during application of the first patches, and,
   b. the second patches are applied by an applicator the surface of which is sufficiently elastomeric so that it deforms during application of the second patches.

5. The method of claim 2 in which
a. the first patch is applied by an applicator the surface of which is sufficiently rigid and uncompressible so that it does not deform substantially during application of the first patch, and
b. the second patch is applied by an applicator the surface of which is sufficiently elastomeric so that it deforms during application of the second patch.

6. The method of claim 2 in which
a. the first patch is applied by a first applicator the surface of which has a recessed area in the configuration of the desired adhesive patch and in which the recessed area contains adhesive to be transferred to the carrier strip, and
b. the second patch is applied by a second applicator on the surface of which is a quantity of adhesive, which quantity of adhesive is of the configuration of the desired second patch and which quantity of adhesive rises above the surface of the second applicator.

7. The method of claim 3 in which
a. the first patch is applied by an applicator the surface of which is sufficiently rigid and uncompressible so that it does not deform substantially during application of the first patch, and
b. the second patch is applied by an applicator the surface of which is sufficiently elastomeric so that it deforms during application of the second patch.

8. The method of claim 6 in which
a. the first patch is applied by a first applicator the surface of which is sufficiently rigid and uncompressible so that it does not deform substantially during application of the first patch, and
b. the second patch is applied by a second applicator the surface of which is sufficiently elastomeric so that it deforms during application of the second patch.

9. An improvement in a method of impregnating adhesive patches into a battery sealant carrier comprising:
a. applying a first patch of adhesive onto one side of the sealant carrier so that the first patch is in the form of a closed loop; and,
b. applying a second patch of adhesive onto the other side of the sealant carrier so that the first patch is in the form of a closed loop and so that the second patch is substantially opposite and coextensive with the first patch, wherein the improvement comprises
c. applying the first patch with a first applicator the surface of which has a recessed area in the configuration of the desired adhesive patch and in which the recessed area contains adhesive to be transferred to the carrier strip,
d. applying the second patch with a second applicator on the surface of which is a quantity of adhesive, which quantity of adhesive is of the configuration of the desired second patch and which quantity of adhesive rises above the surface of the second applicator, and
e. applying at least one of the patches so that its surface rises above the surface of the sealant carrier.

10. The method of claim 9 in which
a. the first patch is applied by a first applicator the surface of which is sufficiently rigid and uncompressible so that it does not deform substantially during application of the first patch, and
b. the second patch is applied by a second applicator the surface of which is sufficiently elastomeric so that it deforms during application of the second patch.

11. An improvement in a method of impregnating adhesive patches into a battery sealant carrier comprising:
a. applying a first patch of adhesive onto one side of the sealant carrier so that the first patch is in the form of a closed loop; and
b. applying a second patch of adhesive onto the other side of the sealant carrier so that the second patch is in the form of a closed loop and so that the second patch is substantially opposite and coextensive with the first patch, wherein the improvement comprises
c. applying the first patch with a first applicator the surface of which is sufficiently rigid and uncompressible so that it does not deform substantially during application of the first patch,
d. applying the second patch with a second applicator the surface of which is sufficiently elastomeric so that it deforms during application of the second patch, and
e. applying at least one of the patches so that its surface rises above the surface of the sealant carrier.

12. An improvement in a method of impregnating adhesive patches into a continuous strip of a battery sealant carrier comprising:
a. applying a succession of first patches of adhesive onto one side of a continuous strip of batter sealant carrier so that each first patch is in the form of a closed loop; and,
b. applying a succession of second patches of adhesive onto the other side of the sealant carrier so that each second patch is in the form of a closed loop and so that each second patch is substantially opposite and coextensive with a first patch, wherein the improvement comprises
c. applying the first and second patches at different viscosities, and
d. applying at least one of the patches so that its surface rises above the surface of the sealant carrier.

13. Thee method of claim 12 in which
a. the first patches are applied by an applicator the surface of which is sufficiently rigid and uncompressible so that it does not deform substantially during the application of the first patches, and
b. the second patches are applied by an applicator the surface of which is sufficiently elastomeric so that it deforms during application of the second patches.

14. The method of claim 12 in which the first and second patches are applied simultaneously.

15. The method of claim 12 in which
a. the first patch is applied by a first applicator the surface of which has a recessed area in the configuration of the desired adhesive patch and in which the recessed area contains adhesive to be transferred to the carrier strip, and
b. the second patch is applied by a second applicator on the surface of which is a quantity of adhesive, which quantity of adhesive is of the configuration of the desired second patch and which quantity of adhesive rises above the surface of the second applicator.

16. The method of claim 14 in which
  a. the first patch is applied by a first applicator the surface of which has a recessed area in the configuration of the desired adhesive patch and in which the recessed are contains adhesive to be transferred to the carrier strip, and
  b. the second patch is applied by a second applicator on the surface of which is a quantity of adhesive, which quantity of adhesive is of the configuration of the desired second patch and which quantity of adhesive rises above the surface of the second applicator.

17. The method of claim 14 in which
  a. the first patches are applied by an applicator the surface of which is sufficiently rigid and uncompressible so that it does not deform substantially during application of the first patches, and,
  b. the second patches are applied by an applicator the surface of which is sufficiently elastomeric so that it deforms during application of the second patches.

18. The method of claim 15 in which
  a. the first patches are applied by an applicator to the surface of which is sufficiently rigid and uncompressible so that it does not deform substantially during application of the first patches, and,
  b. the second patches are applied by an applicator the surface of which is sufficiently elastomeric so that it deforms during application of the second patches.

19. The method of claim 16 in which
  a. the first patch is applied by an applicator the surface of which is sufficiently rigid and uncompressible so that it does not deform substantially during application of the first patch, and
  b. the second patch is applied by a second applicator the surface of which is sufficiently elastomeric so that it deforms during application of the second patch.

20. An improvement in a method of impregnating adhesive patches into a continuous strip of a battery sealant carrier comprising:
  a. applying a succession of first patches of adhesive onto one side of a continuous strip of battery sealant carrier so that each first patch is in the form of a closed loop; and,
  b. applying a succession of second patches of adhesive onto the other side of the sealant carrier so that each second patch is in the form of a closed loop and so that each second patch is substantially opposite and coextensive with a first patch, wherein the improvement comprises
  c. applying the first patches with a first applicator the surface of which has a recessed area in the configuration of the desired adhesive patch and in which the recessed area contains adhesive to be transferred to the carrier strip,
  d. applying the second patches with a second applicator on the surface of which is a quantity of adhesive, which quantity of adhesive is of the configuration of the desired second patch and which quantity of adhesive rises above the surface of the second applicator, and
  e. applying at least one of the patches so that its surface rises above the surface of the sealant carrier.

21. The method of claim 20 in which
  a. the first patch is applied by an applicator the surface of which is sufficiently rigid and uncompressible so that it does not deform substantially during application of the first patch, and
  b. the second patch is applied by an applicator the surface of which sufficiently elastomeric so that it deforms during application of the second patch.

22. An improvement in a method of impregnating adhesive patches into a continuous strip of battery sealant carrier comprising:
  a. applying a succession of first patches of adhesive onto one side of a continuous strip of battery sealant carrier so that each first patch is in the form of a closed loop; and,
  b. applying a succession of second patches of adhesive onto the other side of the sealant carrier so that each second patch is in the form of a closed loop and so that each second patch is substantially opposite and coextensive with a first patch, wherein the improvement comprises
  c. applying the first patches with a first applicator the surface of which is sufficiently rigid and uncompressible so that it does not deform substantially during application of the first patches,
  d. applying the second patches with a second applicator the surface of which is sufficiently elastomeric so that it deforms during application of the second patches, and
  e. applying at least one of the patches so that its surface rises above the surface of the sealant carrier.

* * * * *